(12) United States Patent
Nair et al.

(10) Patent No.: US 11,846,978 B2
(45) Date of Patent: *Dec. 19, 2023

(54) CASCADED DISCOVERY OF INFORMATION ENVIRONMENT

(71) Applicant: EMC IP Holding Company LLC, Hopkinton, MA (US)

(72) Inventors: Manoj Nair, Cary, NC (US); Iva Blazina Vukelja, Everett, MA (US); Arun Dugganapally, Charlestown, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 1154 days.

This patent is subject to a terminal disclaimer.

(21) Appl. No.: 16/548,339

(22) Filed: Aug. 22, 2019

(65) Prior Publication Data

US 2019/0377745 A1   Dec. 12, 2019

Related U.S. Application Data

(63) Continuation of application No. 11/528,783, filed on Sep. 27, 2006, now Pat. No. 10,394,849.

(Continued)

(51) Int. Cl.
*G06F 16/16* (2019.01)
*G06F 16/28* (2019.01)
(Continued)

(52) U.S. Cl.
CPC ........... *G06F 16/285* (2019.01); *G06F 16/16* (2019.01); *H04L 41/12* (2013.01);
(Continued)

(58) Field of Classification Search
CPC ...................................................... G06F 3/067
(Continued)

(56) References Cited

U.S. PATENT DOCUMENTS 5,678,044 A   10/1997   Pastilha et al.
6,003,040 A   12/1999   Mital et al.
(Continued)

FOREIGN PATENT DOCUMENTS

EP            1855218 A2       11/2007
WO     WO 2008/036621          3/2008

OTHER PUBLICATIONS

Ben-Ghorbel-Talbi et al.; "An Extended Role-Based Access Control Model for Delegating Obligations"; Springer-Verlag Berline Heidelberg 2009.

(Continued)

*Primary Examiner* — Eliyah S. Harper
(74) *Attorney, Agent, or Firm* — Workman Nydegger

(57) ABSTRACT

Discovering environment objects for information management in a networked environment. Information management provides services such as data protection, backup, retention, compliance, etc., by classifying the objects and/or infrastructure of an entity according to its value to the entity. Information management begins by discovering the data in a network and by discovering the servers and services operating in a network. The servers and services are discovered using adapters that can collect information regarding the environment objects. Objects can be discovered using cascaded discovery, where the information collected by one adapter is used to drive the collection of additional information by other adapters. This information can then by used by information management systems to assign or orchestrate various services.

20 Claims, 7 Drawing Sheets

Related U.S. Application Data

(60) Provisional application No. 60/826,073, filed on Sep. 18, 2006, provisional application No. 60/826,042, filed on Sep. 18, 2006, provisional application No. 60/826,053, filed on Sep. 18, 2006, provisional application No. 60/826,072, filed on Sep. 18, 2006, provisional application No. 60/826,074, filed on Sep. 18, 2006.

(51) Int. Cl.
*H04L 41/12* (2022.01)
*H04L 41/5003* (2022.01)
*H04L 41/5009* (2022.01)
*H04L 67/51* (2022.01)
*G06F 3/06* (2006.01)
*G06F 16/957* (2019.01)

(52) U.S. Cl.
CPC ...... H04L 41/5003 (2013.01); H04L 41/5009 (2013.01); H04L 67/51 (2022.05); *G06F 3/067* (2013.01); *G06F 16/957* (2019.01); *Y10S 707/99931* (2013.01); *Y10S 707/99942* (2013.01)

(58) Field of Classification Search
USPC ................ 707/104.1, 100, 10, 3, 5, 827
See application file for complete search history.

(56) References Cited

U.S. PATENT DOCUMENTS

| | | | |
|---|---|---|---|
| 6,167,445 A | 12/2000 | Gai et al. | |
| 6,182,075 B1* | 1/2001 | Hsu | H04L 29/06 |
| 6,308,216 B1 | 10/2001 | Goldszmidt et al. | |
| 6,349,297 B1 | 2/2002 | Shaw et al. | |
| 6,363,053 B1 | 3/2002 | Schuster et al. | |
| 6,430,613 B1 | 8/2002 | Brunet et al. | |
| 6,591,300 B1 | 7/2003 | Yurkovic | |
| 6,633,312 B1 | 10/2003 | Rochford et al. | |
| 6,829,745 B2 | 12/2004 | Yassin et al. | |
| 6,862,594 B1 | 3/2005 | Saulpaugh et al. | |
| 6,865,728 B1* | 3/2005 | Branson | H04L 41/0233 |
| | | | 707/999.101 |
| 6,970,869 B1 | 11/2005 | Slaughter et al. | |
| 7,028,312 B1 | 4/2006 | Merrick et al. | |
| 7,185,073 B1 | 2/2007 | Gai et al. | |
| 7,240,076 B2 | 7/2007 | McCauley et al. | |
| 7,278,156 B2 | 10/2007 | Mei et al. | |
| 7,363,292 B2 | 4/2008 | Chaboche | |
| 7,412,518 B1 | 8/2008 | Duigou et al. | |
| 7,433,304 B1 | 10/2008 | Galloway et al. | |
| 7,543,020 B2 | 6/2009 | Walker et al. | |
| 7,548,915 B2 | 6/2009 | Ramer et al. | |
| 7,565,324 B2 | 7/2009 | Vincent | |
| 7,565,656 B2 | 7/2009 | Yamasaki et al. | |
| 7,580,357 B2 | 8/2009 | Chang et al. | |
| 7,613,806 B2 | 11/2009 | Wright et al. | |
| 7,616,642 B2 | 11/2009 | Anke et al. | |
| 7,640,345 B2 | 12/2009 | Nair et al. | |
| 7,676,798 B2 | 3/2010 | Snover et al. | |
| 7,720,950 B2 | 5/2010 | Joanovic et al. | |
| 7,725,570 B1 | 5/2010 | Lewis | |
| 7,725,571 B1 | 5/2010 | Lewis | |
| 7,730,172 B1 | 6/2010 | Lewis | |
| 7,734,765 B2 | 6/2010 | Musman et al. | |
| 7,739,239 B1 | 6/2010 | Cormie et al. | |
| 7,752,312 B1 | 7/2010 | Perrin et al. | |
| 7,895,220 B2 | 2/2011 | Evans et al. | |
| 7,953,740 B1 | 5/2011 | Vadon et al. | |
| 8,046,366 B1 | 10/2011 | Perrin et al. | |
| 8,069,435 B1 | 11/2011 | Lai | |
| 8,104,080 B2 | 1/2012 | Burns et al. | |
| 8,135,685 B2 | 3/2012 | Nair et al. | |
| 8,346,748 B1 | 1/2013 | Nair et al. | |
| 8,522,248 B1 | 8/2013 | Nair et al. | |
| 8,543,615 B1 | 9/2013 | Nair et al. | |
| 8,548,964 B1 | 10/2013 | Nair et al. | |
| 8,612,570 B1 | 12/2013 | Nair et al. | |
| 8,620,724 B2 | 12/2013 | Adhiraju et al. | |
| 8,732,215 B2 | 5/2014 | Nair et al. | |
| 8,819,212 B1 | 8/2014 | Nair et al. | |
| 8,832,246 B2 | 9/2014 | Nair et al. | |
| 8,868,720 B1 | 10/2014 | Nair et al. | |
| 8,938,457 B2 | 1/2015 | Nair et al. | |
| 9,135,322 B2 | 9/2015 | Nair et al. | |
| 9,141,658 B1 | 9/2015 | Nair et al. | |
| 9,323,901 B1 | 4/2016 | Nair et al. | |
| 9,361,354 B1 | 6/2016 | Bell, II | |
| 9,461,890 B1 | 10/2016 | Nair et al. | |
| 2002/0016800 A1 | 2/2002 | Spivak et al. | |
| 2002/0038307 A1 | 3/2002 | Obradovic et al. | |
| 2002/0091746 A1 | 7/2002 | Umberger et al. | |
| 2002/0099814 A1* | 7/2002 | Mastrianni | H04L 29/12009 |
| | | | 709/224 |
| 2002/0109713 A1 | 8/2002 | Carchidi et al. | |
| 2002/0120685 A1* | 8/2002 | Srivastava | G06F 9/44 |
| | | | 709/203 |
| 2002/0161883 A1 | 10/2002 | Matheny et al. | |
| 2003/0023587 A1 | 1/2003 | Dennis et al. | |
| 2003/0023712 A1 | 1/2003 | Zhao et al. | |
| 2003/0036886 A1 | 2/2003 | Stone | |
| 2003/0041050 A1* | 2/2003 | Smith | G06Q 30/02 |
| 2003/0093528 A1 | 5/2003 | Rolia | |
| 2003/0140009 A1 | 7/2003 | Namba et al. | |
| 2003/0167180 A1 | 9/2003 | Chung et al. | |
| 2003/0196108 A1 | 10/2003 | Kung | |
| 2003/0200357 A1 | 10/2003 | Yanosy | |
| 2003/0212778 A1 | 11/2003 | Collomb | |
| 2003/0225829 A1* | 12/2003 | Pena | G06F 17/30899 |
| | | | 709/203 |
| 2003/0233391 A1 | 12/2003 | Crawford et al. | |
| 2003/0233464 A1 | 12/2003 | Walpole et al. | |
| 2003/0234815 A1 | 12/2003 | Delaney | |
| 2003/0236904 A1 | 12/2003 | Walpole et al. | |
| 2004/0060002 A1 | 3/2004 | Lucovsky et al. | |
| 2004/0098415 A1 | 5/2004 | Bone et al. | |
| 2004/0133876 A1 | 7/2004 | Sproule | |
| 2004/0210601 A1 | 10/2004 | Takayama | |
| 2004/0215650 A1 | 10/2004 | Shaji et al. | |
| 2004/0236660 A1 | 11/2004 | Thomas et al. | |
| 2004/0243699 A1 | 12/2004 | Koclanes et al. | |
| 2005/0060662 A1 | 3/2005 | Soares et al. | |
| 2005/0071182 A1 | 3/2005 | Aikens et al. | |
| 2005/0091346 A1 | 4/2005 | Krishnaswami | |
| 2005/0102297 A1* | 5/2005 | Lloyd | G06F 17/30067 |
| 2005/0125768 A1 | 6/2005 | Wong et al. | |
| 2005/0131982 A1 | 6/2005 | Yamasaki et al. | |
| 2005/0132034 A1 | 6/2005 | Iglesia et al. | |
| 2005/0177545 A1 | 8/2005 | Buco et al. | |
| 2005/0197852 A1 | 9/2005 | Gebhard et al. | |
| 2005/0235342 A1 | 10/2005 | Ene-Pietrosanu et al. | |
| 2005/0251533 A1 | 11/2005 | Harken et al. | |
| 2005/0262097 A1 | 11/2005 | Sim-Tang et al. | |
| 2005/0273451 A1 | 12/2005 | Clark et al. | |
| 2005/0289216 A1 | 12/2005 | Myka et al. | |
| 2006/0015388 A1 | 1/2006 | Flockhart et al. | |
| 2006/0036463 A1 | 2/2006 | Patrick et al. | |
| 2006/0039364 A1 | 2/2006 | Wright | |
| 2006/0092861 A1 | 5/2006 | Corday et al. | |
| 2006/0095543 A1* | 5/2006 | Ito | G06F 17/30017 |
| | | | 709/218 |
| 2006/0095570 A1 | 5/2006 | O'Sullivan | |
| 2006/0101084 A1* | 5/2006 | Kishi | G06F 3/0608 |
| 2006/0106782 A1 | 5/2006 | Blumenau et al. | |
| 2006/0112108 A1* | 5/2006 | Eklund | G06F 17/3071 |
| 2006/0114832 A1 | 6/2006 | Hamilton et al. | |
| 2006/0123030 A1 | 6/2006 | Musteata et al. | |
| 2006/0129415 A1 | 6/2006 | Thukral et al. | |
| 2006/0129974 A1 | 6/2006 | Brendle et al. | |
| 2006/0179143 A1 | 8/2006 | Walker et al. | |
| 2006/0236061 A1 | 10/2006 | Koclanes | |
| 2006/0248165 A1* | 11/2006 | Sridhar | H04L 41/5003 |
| | | | 709/218 |

(56) References Cited

U.S. PATENT DOCUMENTS

| | | | |
|---|---|---|---|
| 2006/0248187 A1* | 11/2006 | Thorpe | G06Q 10/10 709/224 |
| 2007/0033273 A1 | 2/2007 | White et al. | |
| 2007/0038683 A1 | 2/2007 | Dixon et al. | |
| 2007/0055689 A1 | 3/2007 | Rhoads et al. | |
| 2007/0058632 A1 | 3/2007 | Back et al. | |
| 2007/0061363 A1 | 3/2007 | Ramer et al. | |
| 2007/0070894 A1* | 3/2007 | Wang | H04W 72/1242 370/230 |
| 2007/0083875 A1* | 4/2007 | Jennings | G06F 8/10 719/330 |
| 2007/0094392 A1 | 4/2007 | Stone et al. | |
| 2007/0103984 A1 | 5/2007 | Kavuri et al. | |
| 2007/0104208 A1 | 5/2007 | Svensson | |
| 2007/0127370 A1 | 6/2007 | Chang et al. | |
| 2007/0153802 A1 | 7/2007 | Anke et al. | |
| 2007/0162749 A1 | 7/2007 | Lim | |
| 2007/0192352 A1 | 8/2007 | Levy | |
| 2007/0208751 A1 | 9/2007 | Cowan et al. | |
| 2007/0214208 A1* | 9/2007 | Balachandran | G06Q 10/10 709/201 |
| 2007/0226228 A1* | 9/2007 | Her | H04L 12/2602 |
| 2007/0260640 A1 | 11/2007 | Hamilton et al. | |
| 2007/0294209 A1* | 12/2007 | Strub | H04L 63/102 |
| 2007/0294406 A1 | 12/2007 | Suer et al. | |
| 2007/0299828 A1 | 12/2007 | Lewis et al. | |
| 2008/0002678 A1* | 1/2008 | Klessig | H04L 41/0803 370/389 |
| 2008/0005086 A1* | 1/2008 | Moore | G06F 17/30876 |
| 2008/0021850 A1* | 1/2008 | Irle | G06F 17/30401 706/20 |
| 2008/0049642 A1* | 2/2008 | Gudipudi | H04L 41/12 370/254 |
| 2008/0059387 A1 | 3/2008 | Vaidhyanathan et al. | |
| 2008/0071726 A1 | 3/2008 | Nair et al. | |
| 2008/0071727 A1 | 3/2008 | Nair et al. | |
| 2008/0071813 A1 | 3/2008 | Nair et al. | |
| 2008/0071908 A1 | 3/2008 | Nair et al. | |
| 2008/0077682 A1 | 3/2008 | Nair et al. | |
| 2008/0077995 A1* | 3/2008 | Curnyn | H04L 63/1416 726/27 |
| 2008/0097923 A1 | 4/2008 | Kim et al. | |
| 2008/0114725 A1 | 5/2008 | Indeck et al. | |
| 2008/0134043 A1 | 6/2008 | Georgis et al. | |
| 2008/0177994 A1 | 7/2008 | Mayer | |
| 2008/0243900 A1 | 10/2008 | Yohanan et al. | |
| 2008/0301760 A1 | 12/2008 | Lim | |
| 2009/0064185 A1 | 3/2009 | Araujo | |
| 2009/0077210 A1 | 3/2009 | Musman et al. | |
| 2009/0106100 A1 | 4/2009 | Mashinsky | |
| 2009/0150431 A1 | 6/2009 | Schmidt et al. | |
| 2009/0157881 A1 | 6/2009 | Kavuri et al. | |
| 2010/0191577 A1 | 7/2010 | Lu et al. | |
| 2010/0250497 A1 | 9/2010 | Redich et al. | |
| 2013/0110810 A1 | 5/2013 | Eidesen et al. | |
| 2013/0110840 A1 | 5/2013 | Nair et al. | |

OTHER PUBLICATIONS

Belokosztolszki et al.; "Meta-Policies for Distributed Role-Based Access Control Systems"; 2002 IEEE.

Gasser et al., "An Architecture for Practical Delegation in a Distributed System", 1990 IEEE Computer Society Symposium, May 7-9, 1990, pp. 20-30.

* cited by examiner

CASCADED DISCOVERY OF INFORMATION ENVIRONMENT

CROSS-REFERENCE TO RELATED APPLICATIONS

This application is a Continuation of U.S. application Ser. No. 11/528,783, filed Sep. 27, 2006, which claims the benefit of:

U.S. Provisional Application Ser. No. 60/826,072, filed Sep. 18, 2006 and entitled "INFORMATION MANAGEMENT";

U.S. Provisional Application Ser. No. 60/826,073, filed Sep. 18, 2006 and entitled "CASCADED DISCOVERY OF INFORMATION ENVIRONMENT";

U.S. Provisional Application Ser. No. 60/826,053, filed Sep. 18, 2006, entitled "ENVIRONMENT CLASSIFICATION";

U.S. Provisional Application Ser. No. 60/826,074, filed Sep. 18, 2006 and entitled "INFORMATION CLASSIFICATION"; and U.S. Provisional Application No. 60/826,042, filed Sep. 18, 2006, entitled "SERVICE LEVEL MAPPING METHOD";

which applications are incorporated herein by reference in their entirety.

BACKGROUND OF THE INVENTION

1. The Field of the Invention

The present invention relates to information management. More particularly, embodiments of the invention relate to systems and methods for automated discovery of environment objects operating in a network.

2. The Relevant Technology

The world is slowly and continually moving from being paper-based to being electronic-based and this is becoming apparent in a wide variety of different systems. Businesses, schools, and even home life are transitioning to electronic systems. For example, email is becoming a primary means of communication rather than sending regular mail. Bills are paid online. Airlines often prefer electronic ticketing and online check-in. The list goes on. There are several reasons for this transition, one of which is the convenience and accessibility of electronic systems. Email, for example, often arrives shortly after sending it.

As entities become more centered on electronic data, the ability to manage the electronic data becomes crucial for a wide variety of different reasons. Much of the electronic data maintained by an entity or organization often relates to different aspects of the entity and often is subject to various considerations. For example, much of the data of an entity may be dependent on the current business. Data related to a new and upcoming product, for example, may be business critical that should be safeguarded in various ways. At the same time, the entity may have older data about a product being phased out that is no longer subject to the same safeguards. More generally, there are a number of different factors that may determine how certain data is handled or that determine the services that are needed for the data. Some of the factors or considerations include data security, data backup, data retention, data access control, regulatory compliance, corporate compliance, and the like or any combination thereof. Further, much of the data is unstructured at least in the sense that the data's value to the entity is not readily known and thus the services required for the data is not necessarily known.

For example, an entity may have a file storage system that it backs up on a regular basis. However, there may be many files on the file storage system that have little or no value to the entity. As a result, the entity is often paying for services that are not required. Perhaps more importantly, there may be content in the file storage system that is not receiving sufficient service.

In other words, one of the problems faced by users is related to being able to better identify services that are required. As discussed above, current users often have too much or to little services. In the latter case, companies are at risk, for example, if they do not apply retention and protection to all the files that need it, like files with personal information about employees. But not all such files are recognized as such and are not getting the right services.

As a result, there is clearly a need in the industry to be able to properly identify and seek the right service levels. At the same time, there is also a need to be able to provide data classification and data reporting, even if existing service levels are not changed. The ability to simply classify data would enable entities to better evaluate the value of their data.

For example, the unstructured nature of most systems often makes it difficult to ensure that the proper services are sought. However, making decisions on how to manage the data of an entity is often further complicated by the organization of the entity irrespective of the data. For example, any given entity typically has more than one "line of business." An engineering firm that performs contract work for the government, for instance, often has data that is associated with the engineering being performed. At the same time, the engineering firm may also have data that is associated with the legal department or corporate aspect of the engineering firm, data that is associated with human resources, and the like. In other words, a given entity often has various domains of data or different shares of data, some of which may be shared by the various lines of business.

In each line of business, there is often data that may be subject to certain requirements that are different from requirements that exist with respect to data in the other lines of business. Further, each line of business may have a different way of referring to types of data. All of these differences combine to make providing information management a complex and difficult process.

In today's world, entities are faced with questions such as identifying the levels of security or retention that apply to various files or needing to know which data is critical to the business. Entities must also account for the effects of time on certain data. Data that is associated with a cancelled project, for example, may no longer require certain services. In addition, entities would like to be able to better value their existing data.

One of the failures of conventional systems is related to their failure to understand and account for their network. A network, for example, may want to secure multiple levels of service. If the service provider is unaware of such storage on a network, however, then it may be unable to provide such service. Further, it is not practical to manually assign objects to the various service levels because of the sheer number of objects that are typically present in a network. This is one of the reasons, that most systems either provide too much or too little protection because of their inability to understand the environment in an automated fashion that can account for differences between the network's objects that often have an impact of the service levels required.

In sum, the data of an entity is an important asset and should be properly safeguarded. This means that services such as back, retention, encryption, etc., need to be obtained and orchestrated such that entities have neither too little or too much services for their data. As indicated above, conventional systems do not enable entities to effectively manage their data. As a result, these entities either have too much or too little protection for their data. Entities need a way to manage their data so as to comply with all relevant requirements without purchasing too many services and without providing insufficient services. Entities also need a way to manage their data in an ongoing manner as conditions in the entity change.

BRIEF SUMMARY OF THE INVENTION

These and other limitations are overcome by embodiments of the invention, which relates to systems and methods for providing information management and in particular to discovering environment objects in a network. The ability to discover and classify environment objects enables an information management system to ensure that a network can better value its data and better identify the types of services that are needed to protect the data.

When providing information management, the discovery of network environments is one of the first processes performed. Through discovery, servers or devices that act like servers are discovered, applications are discovered, and information describing the servers and applications is collected. For example, environment discovery may result in the discovery of a server that provides tiered storage. This information can then be used when assigning storage services for the data. By better matching data requirements with offered levels of service, data can be provisioned with more cost effective services including cost effective services.

In one example of discovery in the context of information management, a discovery module first establishes a connection with multiple adapters. The adapters are able to provide information about environment objects in a network by themselves or in conjunction with another external module. The discovery module then begins discovering environment objects using the adapters. The discovery module receives information from or through the adapters. The information describes aspects about discovered environment objects. At each stage of discovery, attributes or metadata discovered allows the discovery module to user additional adapters in the discovery process to both refine and extend the attributes of a discovered object and to discover further objects related to a previous object. Thus, the discovery of environment objects cascades through the use of adapters and by building on discovered attributes. Finally, the discovered environment objects as well as the corresponding information (attributes or metadata) is stored in a database. This accumulated information can be used by an information management system for various reasons, including identifying service levels or valuing data in a network.

In one embodiment, discovery of environment objects is initiated and objects are discovered. An adapter is used to collect information from the object. The collected information can be used to drive a cascaded discovery of the object such that additional information is collected for each discovered object. The collected information can be used to drive a cascaded discovery of the object such that, for each discovered object, additional information is collected and related. Subordinate objects can also be discovered.

Additional features and advantages of the embodiments disclosed herein will be set forth in the description which follows, and in part will be obvious from the description, or may be learned by the practice of the invention. The features and advantages of the embodiments disclosed herein may be realized and obtained by means of the instruments and combinations particularly pointed out in the appended claims. These and other features of the embodiments disclosed herein will become more fully apparent from the following description and appended claims, or may be learned by the practice of the embodiments disclosed herein as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION OF THE INVENTION

Figure 1:
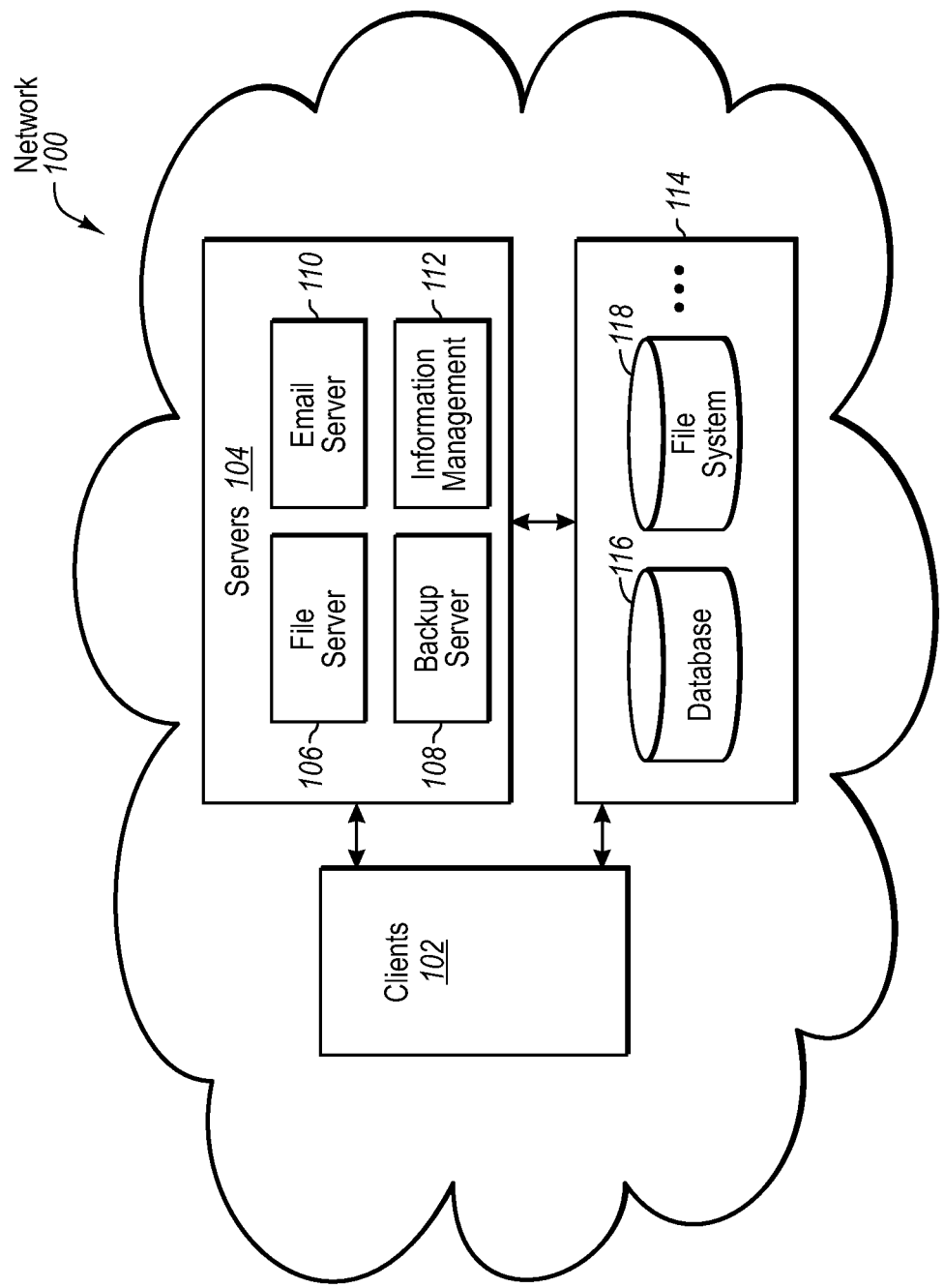
FIG. 1 illustrates an exemplary environment for implementing embodiments of the invention.

Embodiments of the invention relate to information or data management and more particularly to systems and methods for acquiring information describing environment that may include objects including servers, systems, and services. The discovery of environment objects provides information that can be used to better provide or better orchestrate information management. The discovery of environment objects also enables an entity to better value its data.

I. Information Management

Information management enables the orchestration of services such as data protection, data placement, corporate compliance, and others based on the value of the underlying data. The ability of information management to orchestrate and/or provide these services is related to the ability of the information management system to understand the environment in which the services are required. Embodiments of the invention include the acquisition of this knowledge by discovering environment objects in a computer or computing system.

This knowledge can be obtained through discovery of the computer system, which provides the information management system with an understanding of the relationships that may exist between the various servers (and other devices) on the computer system and the data that is accessible over the computer system and the applications or services operating therein. The discovery of a computer system provides an information management system with information that can be used to classify the computer system and its resources as well as the data in the network. Advantageously, embodiments of the invention enable the classification or categorization of objects in a computer system to be automated. As previously discussed, many computer systems include hundreds of thousands of objects. Automated classification is a great advance over manual classification of objects.

After the computer system (infrastructure and data) has been discovered, it is useful to classify the data that is in the computer system. Classification is a process that enables each object to be grouped with other objects or be examined in a manner that enables the needed services for that object to be identified. An object can be any data (e.g., file), server, service, or the like in the network. Classification typically assigns one or more categories to each object.

Once classification is complete (e.g., categories have been assigned to the objects), service level management is performed using the assigned categories. Service level management provides methods for modeling/mapping the results of discovery and classification to service levels. There are two aspects to service level management. First, the categories of each object are examined to identify service level objectives. These service level objectives effectively identify recommended services for each object. The second aspect relates to the service levels that are offered by the resources of a computer system. For example, the servers, storage devices, and services often offer certain services or various service levels in a service package. Service level mapping encompasses both the aspect of identifying service level objectives and then selecting an appropriate service package based on those service level objectives.

After service levels have been identified, the various services can be orchestrated and executed. Advantageously, the services can be carried out with respect to individual objects rather than on shares or drives. As a result, an entity may only pay for the services that are actually needed rather that pay for services that may not be needed. Further, unstructured data is categorized and can be provided with the services based on its value to the entity. In one embodiment, classification is a way for an entity to automatically place a value on the various objects of data. The classification process can also be used as a way to value the underlying objects even if a service package is not selected.

Information management is also a process that can be ongoing. In most computer systems, objects are continually added to a computer system and those objects typically require certain services (backup, retention, etc.). In addition to new objects, many objects also have a lifecycle associated with them. As a result, the status or need for services for certain objects can change over time. Information management incorporates lifecycle aspects such that data that grows old or stale can have the various services changed as needed.

Also, embodiments of the invention include reports, auditing, gap analysis, and the like to ensure that the services being provided are adequate. This protective ability ensures, for example, that a company complies with any applicable rule or regulation. The detection of a gap in service, for example, can lead to a change in service levels.

II. Computing System Environment

Information management is scalable and can be implemented in a variety of different computer or computing systems. A computer system, by way of example only, may refer to a single computer, to multiple computers (including clients and/or server computers, and other devices) that are connected with a network. The objects of a computer system can include servers, applications, services, data, files, content and the like or any combination thereof. Embodiments of the invention are discussed with reference to a network, which is one example of a computer or computing system.

FIG. 1 illustrates an exemplary environment for implementing embodiments of the invention. FIG. 1 is intended to illustrate that, while many systems often have similar functions, the actual implementation from one network to the next can vary significantly. The variability in network configurations is one of the aspects that have hindered conventional attempts at information management. The variability may be related, for example, to the type of software installed, the hardware selected for the network, the configuration of the hardware/software and the like. As previously described, this is one of the reasons that discovery of a network is not limited to the objects in the network but also includes discovery of the servers and services that are operating in the network. An understanding of the objects (including servers and applications) can improve the ease and accuracy with which those objects are classified.

In this example, the network 100 is a computer system that represents a network such as a local area network, a wide area network, and the like or any combination thereof. The connections in the system or network 100 can be wired and/or wireless. In this case, the network 100 typically includes clients 102 that have access to various servers 104 and to data 114. Various services are typically provided by the servers 104 and, in some embodiments, access to some or all of the data 114 is controlled by the various servers 104. Some of the data 114 (e.g., backed up data) is not necessarily available to the clients 102.

Examples of the servers 104 may include a file server 106, an email server 110, a backup server 108, and an information management server 112 and the like or any combination thereof. Each of the servers 104 resides in or is accessible over the network 100. The data 114 may include file storage 118, a database 116, and the like. The file storage 118 and database can be implemented in various ways using different software, different configurations, and the like. The hardware used to store the data 114 can include network attached storage (NAS) systems, and any other system known to one of skill in the art.

The data 114 can also be partitioned in different ways as well for different lines of business within the entity. For example, the data 114 may include a share for home directories, a shared area, an engineering share, and a marketing and sales share. Each share may be in its own domain to allow fine grain management by the respective line of business. One advantage of having different shares is that the corresponding files can be owned by different users.

One of skill in the art can appreciate that the clients 102, servers 104, and data 114 can be connected in a wide variety of configurations using various types of connections. Further, the software that operates on the servers 104, clients 102, and on the data 114 in some instances, may have certain properties or configurations. As previously discussed, it is this variability that can often complicate the ability to manage the information in a network.

III. Discovery of the Environment of a Computer System

Information management according to embodiments of the invention has several components that work together to provide an understanding of the value of an entity's information. Information management also reduces various risks (such as non-compliance) often associated with unstructured data. As described below, embodiments of the invention provide a system for classifying data such that the appropriate services can be provided to the entity's data. Embodiments of the invention also enables services that are required by an entity to be effectively identified and orchestrated. Examples of the services often required by entities includes backup services, retention services, corporate compliance services, regulatory compliance, data accessibility, data deletion, and the like or any combination thereof.

Figure 2:
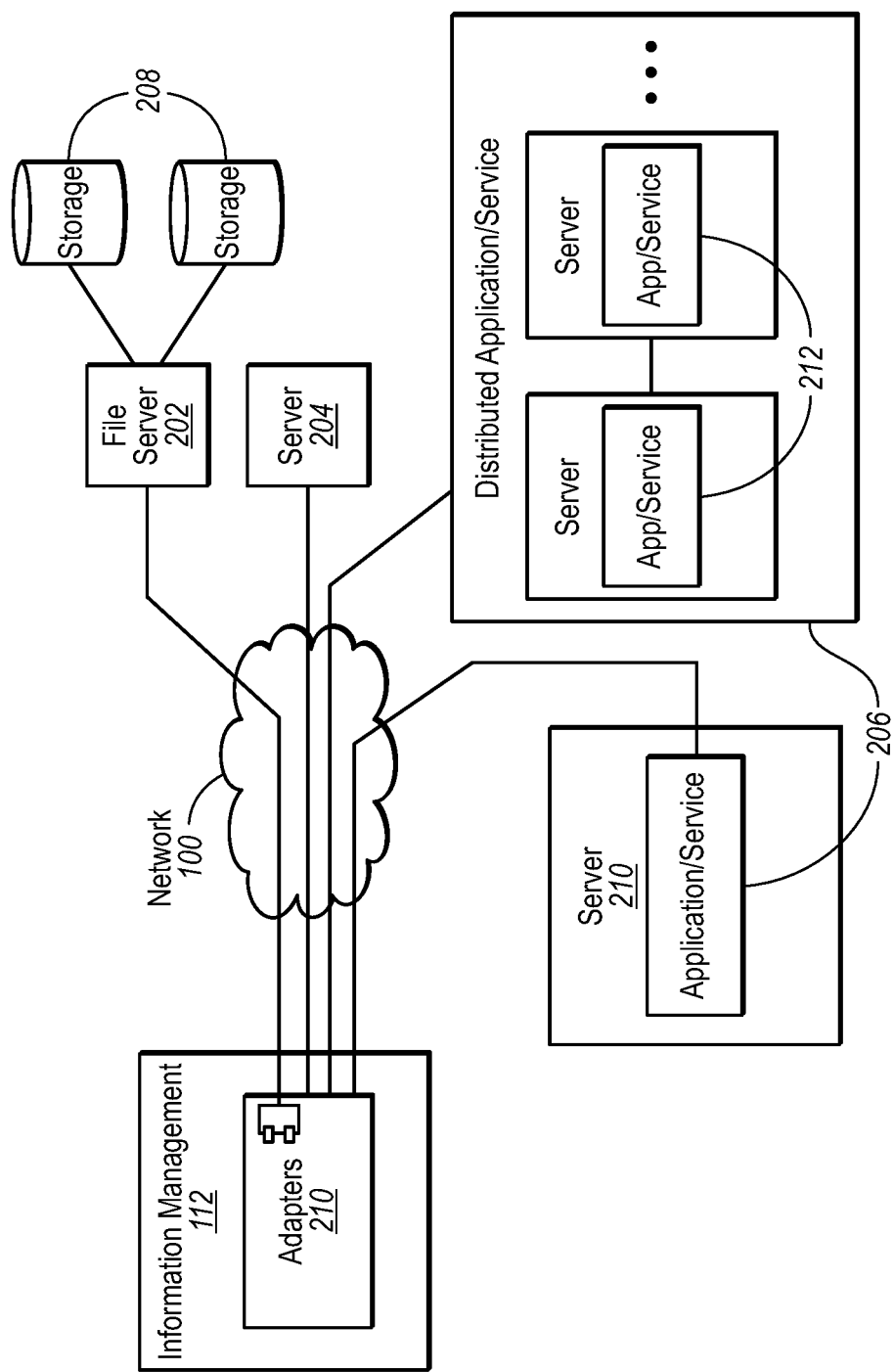
FIG. 2 illustrates one embodiment of a systems for discovering environment objects including servers and services in a network.
Figure 3:
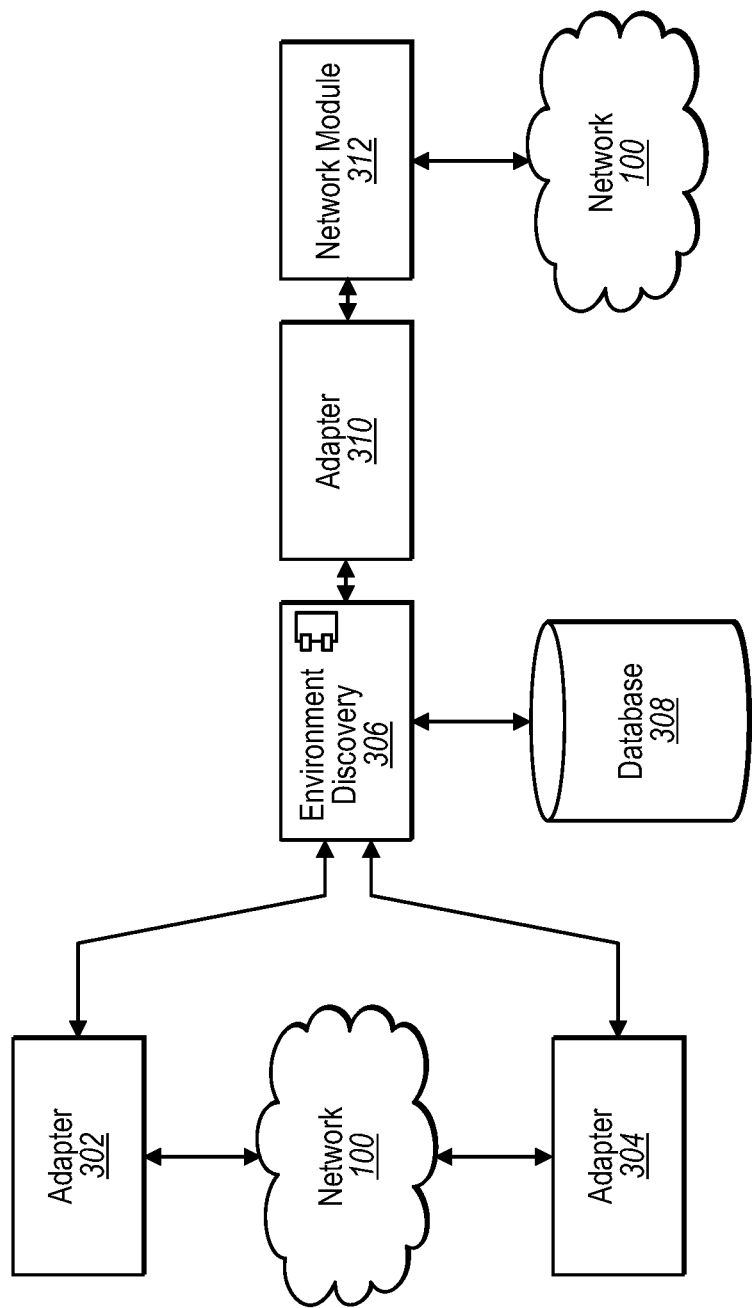
FIG. 3 illustrates a discovery module that uses multiple adapters to discover environment objects in a network.
Figure 4:
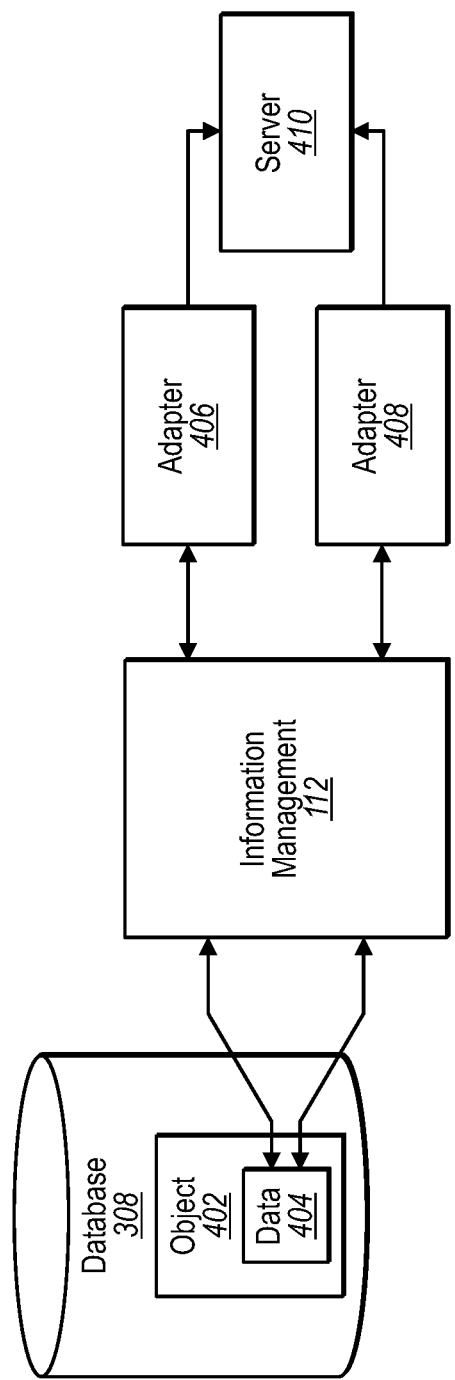
FIG. 4 illustrates an embodiment of information management that uses multiple adapters to discover and accumulate data describing an environment object such as a server.

FIG. 2 is a block diagram illustrating general concepts of discovering environment objects, which is further discussed in FIGS. 3 and 4. As noted previously, the discovery of the environment or of environment objects is often the first element of information management. The discovery of an environment can be repeated much less frequently that other aspects of information management. This is related to the fact that an environment is subject to less change compared, for example, to documents that may undergo frequent change. Of course, discovery can be performed at any time. Further, discovery may be initiated, for example, when a new device is detected on a network, or for other reasons that reflect a change to the environment.

FIG. 2 illustrates systems and methods for discovering an environment. In this example, the information management system 112 has access to a network 100. By way of example, a file server 202, a server 204, and a service 206 are connected with the network 100. The network 100 may include an application, for example, that may include a server, a database, a plurality of servers, etc. The application may be discovered to exist on one server 210 or, in the case of a distributed application, on multiple servers 212. Embodiments of the invention can classify an application 206, however, as a logical environment object. The ability to identify a file server 202, a server 204, or a service 206 enables the information management 112 to better understand the environment and may have an impact on the services provided to the environment including the network 100. For example, discovering that a server offers tiered storage, for example, enables storage services to be provided to data objects in a more cost effective manner.

In FIG. 2, the file server 202 and the server 204 are typically located or associated with an IP address. The service 206, such as an application, may not have an IP address, but is detected in other ways. The information managements system 112 often begins discovering the environment by walking a range of IP addresses in the network 100. In this way, the information management system 112 can discover all of the devices or environment objects in the network 100 that are acting like a server. The cascaded nature of the discovery process allows for these initially discovered objects (based on an IP discovery in this example) to be processed by other adapters which may discover non-IP based objects, such as the storage devices 208 and the applications 206.

In this example, the information management system 112 discovers the file server 202 and the server 204. Even though the storage 208 being managed by the file server 202 may have an IP address, it is not necessarily acting like a server. Often, the storage 208 may not have an IP address and are discovered as additional adapters probe the capabilities and attributes of the server 202. As a result, this aspect of the infrastructure of the network 100 may not be discovered initially, but is discovered through the use of additional adapters.

FIG. 2 further illustrates that the information management system 112 often uses adapters 210 to discover environment objects in the network 100. While not a requirement, the adapters 210 can be specifically configured and adapted for certain types of discovery. In this example, the discovery of all environment objects on the network 100 that are acting like a server can be discovered using an adapter 210. Thus, the information management system 112 can discover environment objects that may include, but are not limited to, file servers, backup systems, email systems, and the like.

FIG. 3 illustrates additional details regarding the discovery of a computer system such as a network. FIG. 3 illustrates an environment discovery module 306 that is part of an information management system. The discovery module 306 has access to a database 308 that is used to store information (metadata) that is collected about environment objects in the network. In this example, a network module 312 has access to the network 100 and may be able to perform certain actions related to discovery of the network. The environment discovery module 306 communicates with the module 312 through an adapter 310. In one embodiment, the adapter 310 abstracts the discovery of a network.

Advantageously, the discovery module 306 is not required to have a complete understanding of all types of environment objects. The adapters enable the discovery module 306 to collect the necessary information. In effect, the adapters provide a common strategy for interacting with various modules and services that can provide information about the environment objects.

FIG. 3 also illustrates adapters 302 and 304 that are different from the adapter 310. The adapters 302 and 304 are typically enabled to collect different types of data or more specific types of data. For example, the adapters 302 and 304 may build or probe the objects discovered by an earlier adapter 310. The adapter 310, for instance, may discover a device acting on a server. The adapter 302 can then discover that the server provides backup storage. The adapter 304 may be configured to probe a specific type or brand of backup server. Thus, the adapter 304 may be able to collect metadata such as firmware version, storage capacity, storage capabilities, etc.

FIG. 4 provides another illustration of the use of adapters to discover a network. In this example, the information management is using the adapter 406 and the adapter 408. The adapter 406 has the ability to interact with a module that can discover devices that operate as a server. In this example, the adapter 406 is used to discover the server 410 on the network. The information management system 112 receives this information from the adapter 406 and stores the information as data 404 in an object 402 of the database 308.

The adapter 408 is associated with another module that may provide a compatibility database that enables, for example, compatibility of the server 410 to be identified. This information received through the adapter 408 is added to the data 404. In this manner, the information management system 112 begins to collect information that enable the objects in the computer system (network in this example) to be discovered in a manner that can later be used to provide services that may include, but are not limited to, backup, retention, encryption, secure storage, tiered storage, file migration, disaster recovery, operational recovery, corporate compliance, regulatory compliance, and the like or any combination thereof.

For example, the server 410 may be a back up server that backs up data on the network. The adapter 406 may only be able to discover that the server 410 is acting like a server. The adapter 406, however, is unable to determine that the server 410 is a backup server. The adapter 408 may be able to determine that the server 410 is compatible with a particular operating system. This enables the information management system to collect additional information from the server 410 that can be stored in the data 404.

Alternatively, the adapter 408 may be specifically designed for the server 410. For example, the server 410 may be a gateway to a storage system such as a NAS server. The adapter 408 is an adapter specifically targeted to the NAS server. As a result, the adapter 408 may be able to discover additional information that may include, but is not limited to, firmware version, type of storage, IP addresses of storage devices, tiered storage capabilities, and the like or any combination thereof.

The discovery of the network can provide a substantial benefit to the information management system when it comes time to identify services and to orchestrate those servers. For example, by discovering that a backup server provides tiered storage, or by determining the amount of storage available, etc., the backup services can be allocated appropriately. Thus, files that are categorized as requiring second tier storage or lower priority storage can be stored accordingly while files requiring first tier or high priority services can also be stored accordingly.

Advantageously, the cost incurred by an entity for certain services can be managed more effectively because the entity's data is being provide with services that are actually required. Thus, an entity is not necessarily charged for services that are not required. At the same time, the entity can be assured that it is receiving the services that it actually needs.

In another example, part of the discovery of the environment also includes discovery of services. The discovery of services can also involve the use of adapters. For example, a payroll application often involves a software aspect (people management) and hardware (database). An adapter can be used to identify tables and log files in a database that are consistent with the software application. Next, communications to the database can be examined to identify the types of queries or to examine the headers of the communications. This information together can enable the information management service to identify the various communicating components and to present the application as an environment object of the network. For example, when particular tables of the database are known to be part of a payroll application, then they may be backed up more frequently, retained for some period of time, encrypted if they contain personal data, and the like.

As illustrated below, the discovery of a computer system results in the collection of data that can be used by an information management system as it categorizes objects (including environment objects) and determines services level objectives for those objects.

In another embodiment of the invention, the discovery module or the discovery portion of information management can attempt to collect more information from environment objects by simply attempting to communicate using various protocols. If an environment object does not respond to a particular call or to the use of a particular adapter, then another can be tried.

In another embodiment, information gleaned from one adapter can be used to select the next adapter. For example, a server operating on a network may be identified as a Windows device. In this case, a windows adapter can then be tried to collect additional information. If the windows device reveals that the server is an email server, then the appropriate adapter for that type of email server can be used to collect additional data.

Figure 6:
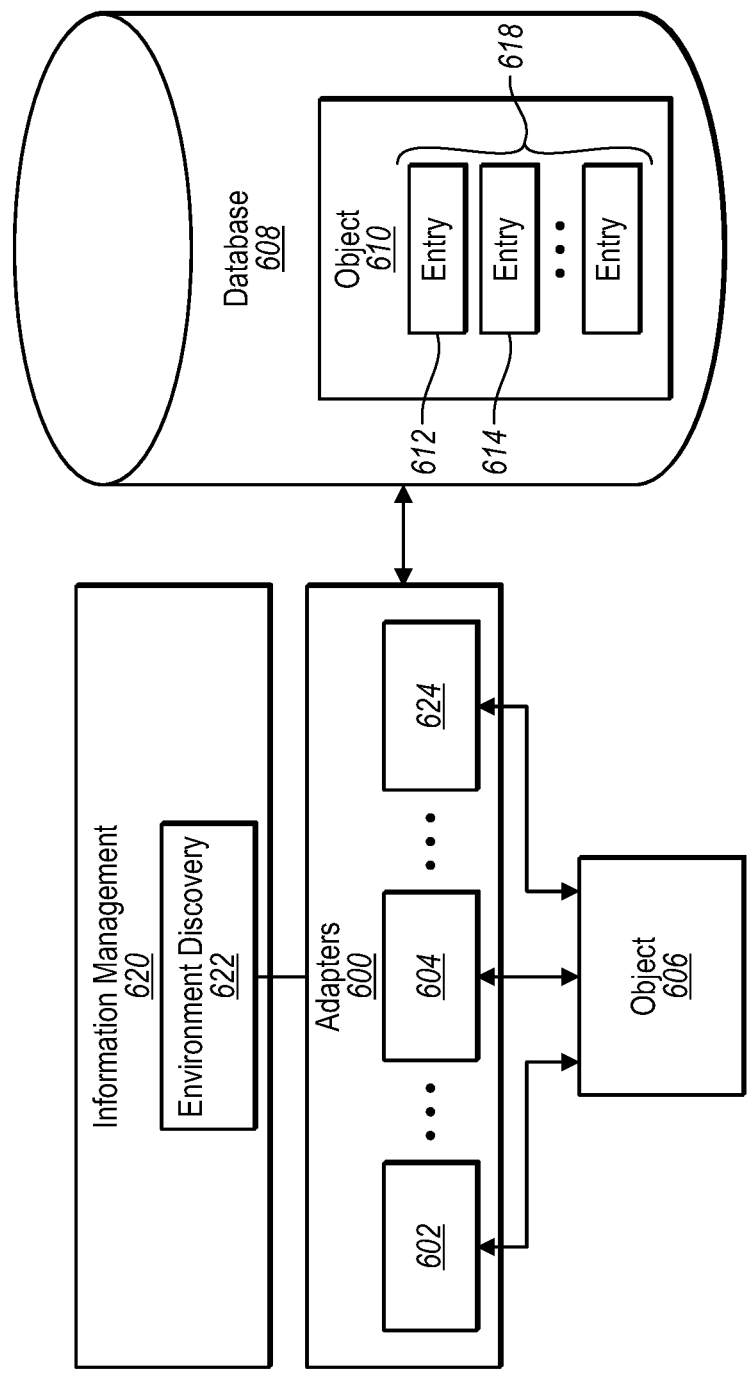
FIG. 6 is a block diagram illustrating cascaded discovery of an environment object.

FIG. 6 illustrates another aspect of environment discovery including cascaded environment discovery. In cascaded environment discovery, increasingly detailed descriptions of environment objects are gathered by using the results from each stage of the discovery process to drive the next stage of the discovery process Over time the collected information accumulates and can be used to better categorize all objects (environment objects, data objects, etc.) and better value the objects of the network. Also, more information about an object enables the needed service level objects to be identified more accurately, and orchestrated more effectively. Further, the information collected about a service or an object (such as a backup server) can aid the classification process in identifying service levels and in orchestrating the associated services.

In this example, an object 610 is created in a database 608 for each object in the network including environment objects. In this example, the object 610 is associated with the environment object 606 and the entries 618 represent the information discovered by the information management system 620 about the object 606. The object 610, in other words, contains metadata about the corresponding object in the computer system.

More particularly, the discovery module 622 of the information management system 620 uses the adapters 600 to discover environment objects such as servers, applications, and the like as previously described. In this example, the adapter 602 has discovered the object 606 is acting like a server on the network. This information may be stored as an entry 612 in the object 610.

With this information, the object 606 may then be probed with the adapter 604, which discovers that the object 606 is a file server. This information may be stored as the entry 614 in the object 608. With this type of known information, the object 606 may be examined with other adapters to determine the type of file server. In this example, the adapter 624 is for a particular type that is the same as the type of file server. For example, the object 606 may be a "X" file server (among other choices) and the adapter 624 may be an "X" specific adapter. As a result, the adapter 624 may be able to discover additional information such as firmware version and other configuration information that is unique to this specific type of file server. This information is also stored in the object 610.

In cascaded discovery, the results obtained by a particular adapter can therefore be used to drive the process of additional discovery. By discovering an object in this manner, an information management system can more effectively assign categories to content and more effectively identify service level objectives, better value the data, and the like or any combination thereof.

For example, it may be discovered that the object 606 offers tiered storage. With this knowledge, an information management system can identify specific service level objectives for other objects accordingly. As a result, the objects ultimately receive the needed services. Alternatively, the information management system 620 may be made aware of its needs by the discovery and classification processes performed by the information management system 620 without actually changing existing service levels.

Figure 7:
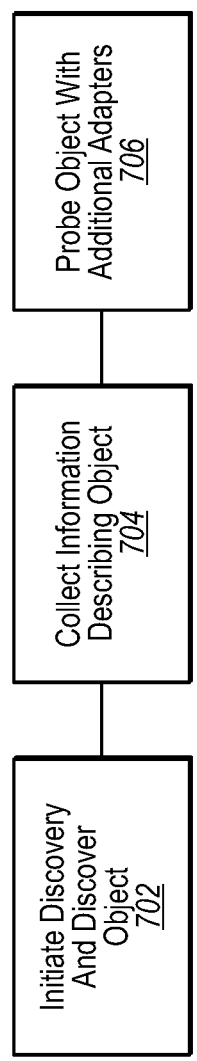
FIG. 7 is an exemplary flow diagram for cascaded discovery of environment objects.

FIG. 7 is a flow diagram illustrating one embodiment of cascaded discovery. In this example, an information management system initiates 702 discovery of environment objects and discovers objects. As previously described, initiating discovery may involve probing the network with an adapter. This adapter can test for compatibility, supported operating systems, whether the object is a server or acting like a server, and the like or any combination thereof. If an object fails to respond to a particular adapter, another adapter may be tried.

In this example, however, the information management system collects 704 information describing a discovered object. Using this collected information, an information management system may then probe 706 the object with additional adapters. In this manner, the environment objects are subjected to cascaded discovery as described herein.

IV. Discovery in Information Management

Figure 5:
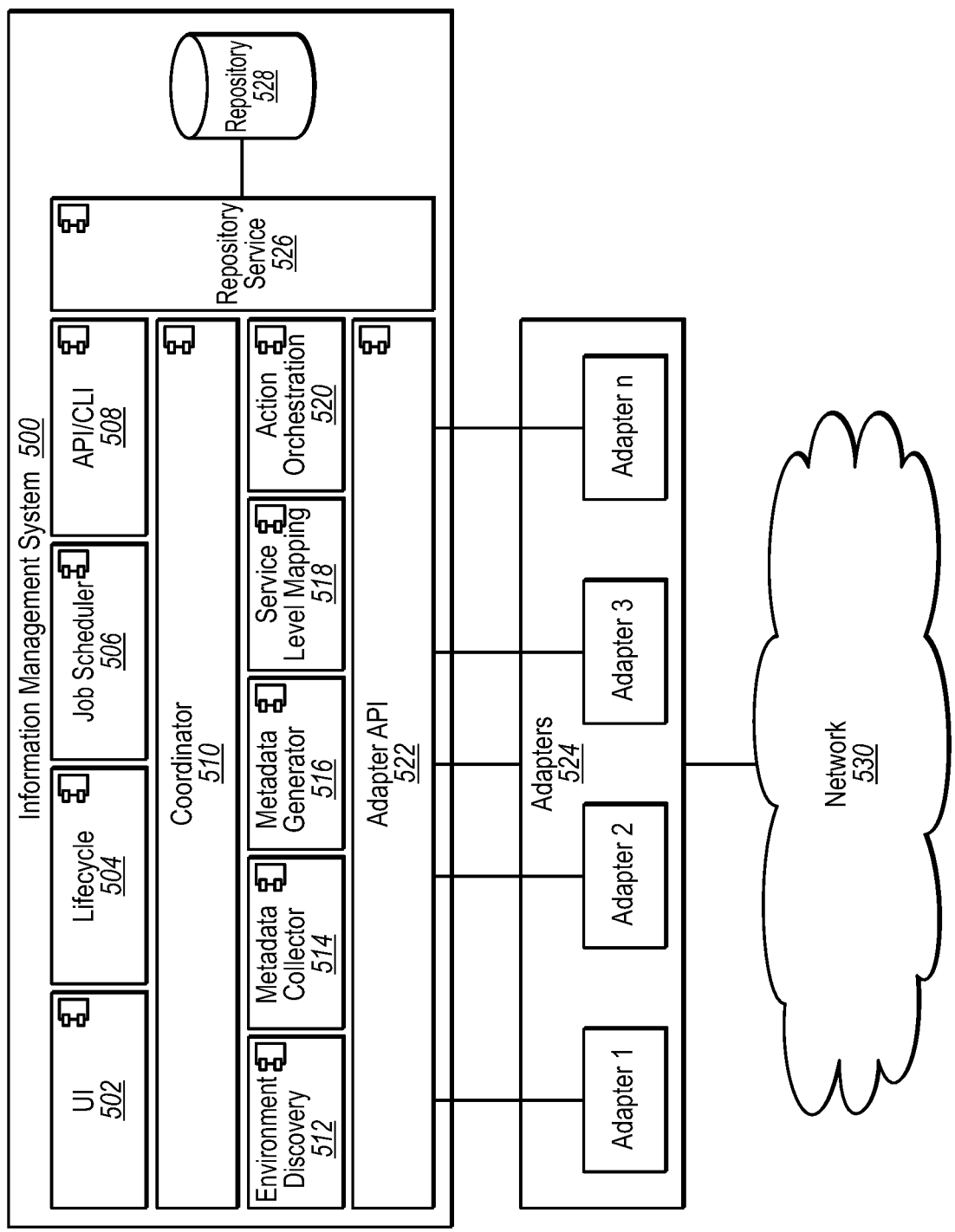
FIG. 5 illustrates an exemplary architecture for information management in a network environment.

The following discussion illustrates the discovery of a network in the context of information management. and FIG. 5 illustrates one embodiment of an architecture for an information management system. This embodiment of information management uses adapters to interface with the computer system. By using adapters, the information management system 500 provides scalability and adaptability as the configuration of the computer system changes over time.

In this example, the information management system 500 includes an adapter API 522 that interfaces with a plurality of adapters 524. The adapters 524 are used by the information management system 500 to interface with network (or with another computer system). Information management 500 uses adapters 524 to discover the infrastructure of the network, to discover the objects (data, files, information, etc.) of the network, for classification of the data, and/or for action orchestration.

The adapters 524 can each be specifically prepared to enable the information management system 500 to interface and interact with various aspects of the network. For example, one adapter may enable the system 500 to discover IP devices on the network that are acting like servers. Another adapter may enable the system 500 to discover more information about specific types of network attached storage (NAS). Another adapter may enable the system 500 to example or watch the network in order to discover services. For example, if a particular NAS has its own adapter, it can typically collect more information than what can be collected by a generic adapter. For example, the specific adapter can take advantage of features in the NAS that are not necessarily available to other adapters. As more information is discovered or collected, the information management 500 can perform better classification. One of skill in the art can appreciate that many different adapters are possible. The adapters 524 can be used by each aspect of the system 500.

The system 500 includes an adapter manager 522 that provides an interface between the adapters 524 and the system 500. The adapter manager 522 can abstract the interface between the system 500 and the adapters 524 such that adapters can easily be accommodated by the system 500.

The discovery 512 portion of the system 500 uses the adapters 524 to discover the infrastructure and the other objects of the network 526. The discovery 512 portion, for example, may use a particular adapter to discover information about a backup server. The discover 512 portion may also use other adapters to discover the same backup server. All of the information collected through the adapters 524 can be combined or correlated.

After discovery (or during in some instances), classification is performed. In this embodiment, classification includes metadata collection 514 and metadata generation 516. The metadata collection 514 portion begins to collect metadata about the infrastructure and the objects. This can be performed, for example, by queries through the various adapters 524. Examples of metadata include size, owner, path, line of business, creation date, or any other information that can be collected using an adapter or information that may be provided about the data or device.

Metadata can also be generated during metadata generation 516. The generated metadata generates additional metadata that can be used to classify the data. For example, rules, hash rules, computer information service rules, classifier rules, etc. are examples of rules or methods that can be used to generate metadata. Finally, category assignment rules are executed that assign the data to one or more categories.

Once the categories have been assigned to the various objects, the coordinator 510 can then initiate service level mapping 518. Service level mapping includes identifying service level objectives from the assigned categories of the objects. The desired services are then mapped to services that are actually available. For example, a service provider that offers backup, retention, and other services often offers bundles of services, but does not typically offer bundles that specifically cover every potential need or variation. As a result, service level mapping is the process of identifying the best fit. One of skill in the art can appreciate that embodiments of the invention could identify the exact services required, but may be limited by the services that are actually available. As a result, service level mapping includes the process of mapping the services level objectives to available services from the service providers.

Next, the coordinator 510 provides action orchestration 520. Action orchestration 520 is the process by which the selected services in the service levels can be implemented. In one example, the action orchestration submits a proposal to orchestration adapters. The adapters report their ability to satisfy the proposal of the action orchestration 520 at specified locations. The action orchestration 520 then selects the best location and adapter set to satisfy the service requirements of the data. The actions are then performed.

The information management system includes a repository service 526 that has access to a database 526. In one embodiment, the database 528 is used to store infoobjects, which are objects used to record the processing state of data in the network and to record specific information. The infoobject can be persisted for state information and can support dynamic properties. For example, as new information is discovered or additional classification information is found or accumulated, this information can be recorded and stored in the infoobject. For example, an infoobject may include the categories assigned for data. These categories, as described above, can then be used for service level mapping.

The embodiments described herein may include the use of a special purpose or general-purpose computer including various computer hardware or software modules, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method for performing information management in a network, the method comprising:
   discovering first information about environment objects connected to the network using a first adapter;
   receiving the first information from the first adapter, the first information describing one or more aspects about discovered environment objects;
   storing the first information from the first adapter in a database;
   discovering second information about the environment objects discovered by the first adapter using a second adapter that is configured to discover the environment objects based the first information;
   storing the second information from the second adapter in the database;
   selecting services for data objects based on the first information and the second information; and
   performing the services for the data objects.

2. The method of claim 1, wherein the first adapter is operable to walk a range of IP addresses in the network to discover environment objects acting like servers.

3. The method of claim 2, wherein the environment objects acting like a servers includes one or more of email servers, backup servers, file servers and wherein the second adapter is operable to provide compatibility information for the discovered environment object based on the first information discovered by the first adapter.

4. The method of claim 1, wherein the plurality of adapters includes an additional adapter that is operable to discover additional information including one or more of, firmware version, type of storage, IP addresses of storage devices, tiered storage capabilities, or any combination thereof, wherein the additional information is discovered at least in part based on the first information and the second information.

5. The method of claim 1, wherein the plurality of adapters includes an additional adapter that is configured to discover applications operating in the network.

6. The method of claim 1, further comprising determining service levels and services for the environment objects in the network or the data objects stored in the network.

7. The method of claim 6, further comprising classifying the data objects in the network based on first metadata collected from the data objects and second metadata that is derived from the data objects, the first metadata and the information and about the environment objects by assigning categories to each of the data objects.

8. The method of claim 7, further comprising identifying service level objects based on the categories assigned to the data objects and selecting the services based on the service level objectives.

9. The method of claim 8, further comprising orchestrating the services.

10. A method for performing information management in a network with an information management system, the method comprising:
    discovering first information about environment objects connected to the network using a first adapter;
    receiving the first information from the first adapter, the first information including metadata describing one or more aspects about discovered environment objects;
    storing the first information from the first adapter in a database;
    discovering second information about the environment objects discovered by the first adapter by driving a second adapter with the first information to discover the second information;
    storing the second information from the second adapter in the database;
    selecting services for data objects based in part on the first information and the second information; and
    performing the services for the data objects.

11. The method of claim 10, further comprising connecting the information management system with a plurality of adapters including the first adapter and the second adapter and performing cascaded discovery of the environment objects and data objects using the plurality of adapters, wherein cascaded discovery includes driving a subsequent adapter with information acquired by a previous adapter.

12. The method of claim 11, further comprising identifying services operating in the networked environment using a third adapter, wherein the services includes an application and hardware and wherein the third adapter identifies data in the networked environment that is consistent with the application and identifies communicating components of the services by examining communications to the services that occur over the networked environment.

13. The method of claim 12, further comprising classifying data objects in the networked environment based on first metadata collected from the data objects and second metadata that is derived from the data objects such that each data object is associated with one or more categories.

14. The method of claim 13, further comprising identifying service level objectives for each of the data objects based on the assigned categories, based on the information discovered by the first adapter and the second adapter and the third adapter and selecting services for the data objects based on the service level objectives.

15. The method of claim 14, further comprising performing the services for the data objects.

16. The method of claim 10, wherein discovering environment objects further comprises examining a range of IP addresses in the network to identify each environment object acting like a server with the first adapter, wherein the first information includes the environment objects acting like a server.

17. The method of claim 10, further comprising performing cascaded discovery using a plurality of adapters including the first adapter and the second adapter, wherein the cascaded discovery includes driving a subsequent adapter with information acquired with a previous adapter.

18. The method of claim 12, further comprising identifying one or more of firmware version, available storage capability, tiered storage capabilities, IP addresses of storage devices, or any combination thereof using additional adapters included in the plurality of adapters, wherein the plurality of adapters are driven with information obtained from previous adapters.

19. The method as recited in claim 10, wherein the second adapter is capable of discovering information that the first adapter is incapable of discovering.

20. The method of claim 14, further comprising:
performing service level management using categories assigned during data classification by:
examining a category of a data object to determine a service level objective for that data object; and
selecting a service package for the data object based upon the service level objective; and
carrying out, with respect to the data object, one or more services of the selected service package.

* * * * *